United States Patent
Grossmann

(10) Patent No.: US 10,225,540 B2
(45) Date of Patent: Mar. 5, 2019

(54) AUTOSTEREOSCOPIC MULTI-VIEW SYSTEM

(71) Applicant: SeeFront GmbH, Hamburg (DE)

(72) Inventor: Christoph Grossmann, Hamburg (DE)

(73) Assignee: SeeFront GmbH, Hamburg (DE)

( * ) Notice: Subject to any disclaimer, the term of this patent is extended or adjusted under 35 U.S.C. 154(b) by 0 days.

(21) Appl. No.: 15/536,045

(22) PCT Filed: Dec. 30, 2015

(86) PCT No.: PCT/EP2015/081389
§ 371 (c)(1),
(2) Date: Jun. 14, 2017

(87) PCT Pub. No.: WO2016/107892
PCT Pub. Date: Jul. 7, 2016

(65) Prior Publication Data
US 2017/0347083 A1    Nov. 30, 2017

(30) Foreign Application Priority Data
Dec. 30, 2014  (EP) ................................. 14200536

(51) Int. Cl.
| H04N 13/106 | (2018.01) |
| H04N 13/368 | (2018.01) |
| H04N 13/383 | (2018.01) |
| H04N 13/31  | (2018.01) |
| H04N 13/398 | (2018.01) |
| H04N 13/302 | (2018.01) |
| H04N 13/376 | (2018.01) |
| H04N 13/351 | (2018.01) |

(52) U.S. Cl.
CPC ......... *H04N 13/106* (2018.05); *H04N 13/302* (2018.05); *H04N 13/31* (2018.05); *H04N 13/351* (2018.05); *H04N 13/368* (2018.05); *H04N 13/376* (2018.05); *H04N 13/383* (2018.05); *H04N 13/398* (2018.05)

(58) Field of Classification Search
CPC .. H04N 13/106; H04N 13/368; H04N 13/383; H04N 13/31; H04N 13/398; H04N 13/302; H04N 13/376; H04N 13/351
See application file for complete search history.

(56) References Cited

U.S. PATENT DOCUMENTS

| 6,801,243 B1 | 10/2004 | Van Berkel |
| 2013/0057575 A1* | 3/2013 | An ................ H04N 13/356 345/619 |

FOREIGN PATENT DOCUMENTS

| WO | 2008/011888 A1 | 1/2008 |
| WO | WO-2008011888 A1 * | 1/2008 ......... G02B 27/0093 |

\* cited by examiner

*Primary Examiner* — Oschta I Montoya
(74) *Attorney, Agent, or Firm* — Richard M. Goldberg

(57) ABSTRACT

A method for the autostereoscopic representation of images on a display screen includes the steps of selecting a view mode from a plurality of pre-defined view modes; creating a channel mask that defines a number N of channels per segment of the optical plate, wherein N is larger than or equal to the number of views in the selected view mode; providing a texture for each of the N channels; correlating each screen pixel with at least one texture by reference to the channel mask; applying an allocation algorithm for allocating the total of the image information to be displayed at a time to at least two textures such that each texture includes the information for one view.

6 Claims, 8 Drawing Sheets

AUTOSTEREOSCOPIC MULTI-VIEW SYSTEM

BACKGROUND OF THE INVENTION

The invention relates to a method for the autostereoscopic representation of images on a display screen having a pixel grid, wherein a parallax separating optical plate composed of a plurality of segments is disposed in front of the screen, and image information for left and right eyes of at least one user is displayed in interleaved pixel patterns on the screen, the method comprising the steps of:

a) applying an algorithm for allocating the total of the image information to be displayed at a time to at least two textures such that each texture includes the information for one view; and b) for each pixel, applying a sampling algorithm for sampling image information from selected areas of the textures for determining an image content of the pixel, wherein, when a pixel is correlated with more than one texture, the sampling algorithm comprises a step of determining a correlation factor of the pixel with each of said textures and a step of blending sampling results from each of said textures in accordance with the corresponding correlation factors.

In an autostereoscopic display, a three-dimensional visual impression is achieved by presenting slightly different views to the left and the right eye of a viewer, such that the difference in the two views corresponds to the parallactic displacement of near objects relative to a more distant background. To create these different views a 'parallax separating optical plate' is employed which assures that different views are visible for the left and the right eye of the user. The optical plate is composed of a plurality of segments and may for example be a lens array, where the segments are lenses and the effect is used that for any given point of view, some of the pixels on the screen are magnified, while other pixels remain invisible. The positions of visible and invisible pixels on the screen will depend upon the configuration of the lens array and the positions of the eyes of the user, so that it is possible to display the image information on the screen in such a way that for a given view position one eye of the viewer will only see the pixels belonging to one view, whereas the other eye will only perceive the pixels that belong to the other view. As an alternative, the parallax separating optical plate may be formed by a barrier mask wherein the segments form a pattern of transparent and non-transparent parts, or by an equivalent optical system.

In a typical embodiment the lens array is composed of cylindrical lenses with an inclination relative to the direction of the columns of the pixel grid in order to avoid moiré and to obtain a well balanced image with respect to the unavoidable loss of optical resolution.

U.S. Pat. No. 6,801,243 B1 discloses a so-called multi-view system. The term "multi-view" indicates that the number N of views is larger than 2. Still, the views will include at least one view for the left eye and at least one view for the right eye, and these two views constitute a so-called stereo-pair. However, there may be a plurality of stereo-pairs, which will become visible one after the other when the user moves his head sideways relative to the screen. The image contents of the different stereo-pairs may be selected so that they reflect not only the parallactic displacement but also an apparent rotation of the three-dimensional objects resulting from the change in the aspect angle under which the objects are viewed, so that the user, when moving his head, will have the impression that he actually "moves around" the 3D objects.

US 2013/057575 A1 discloses a multi-view system which permits to change the number of views.

In conventional multi-view systems, a relative abrupt, perceptible transition occurs when the viewer changes his position from one stereo-pair to a neighbouring one. These transitions can be smoothened by increasing the number N of different views. However, the increased number of views comes at the cost of reduced resolution, because in an N-view system maximally 1/N of the number of pixels in a pixel line of the screen will be visible at a time to a particular eye.

In the known systems, the number N of views is determined by a well-defined relation between the lens array and the pixel grid of the screen so that an integer number of pixels is assigned to each lens and each pixel holds content of one of the N views. The lenses of the lens array and the pixel lines of the screen may be considered to constitute a coarse pixel grid composed of "super pixels" having a height corresponding to one or more screen pixel lines and a width corresponding to the width of an individual lens. For each of the N views, each super pixel must include at least one screen pixel that is assigned to that view. It is possible, however, that the number of screen pixels per super pixel is a non-integral number.

WO 2008/011888 A1 (EP 2 044 480 B1) discloses a system according to the preamble of claim 1. This system is a two-view system (N=2), wherein, however, the number of screen pixels per view and lens and pixel line is larger than 2. In order to allow for changes of the viewing position, this system may be equipped with an eye tracker, i.e. a camera and suitable software for determining the actual view position of a user, and the assignment of the screen pixels to the left or right channel, i.e. to the view for the left eye or the right eye of the viewer, is changed dynamically in accordance with the detected view position. In each super pixel, the screen pixels that are not visible from the given view position are used for displaying duplicates of the visible image information which generates a certain amount of redundancy, such that a greater robustness is achieved when the user moves his head and an eye tracking system is either not available or is not quite fast enough to follow-up in real time. Furthermore this configuration allows to adapt the system to different viewing distances.

The system disclosed in EP 2 044 480 B1 is particularly adapted to take advantage of the enhanced capabilities of modern graphics cards for driving the display screen, in particular the capability to operate on specific data structures that are termed "texture maps" or in short "textures". A texture is a two-dimensional array which contains image information stored in "texels" (similar to a conventional bitmap which contains "pixels") and these texels are mapped to pixels on the screen. The image content displayed in a pixel on the screen with the position (x, y) is a function of the two texture coordinates (u, v) which designate the position of this image information in the texture. The convention is that $0 \leq u \leq 1$ and $0 \leq v \leq 1$ so that u and v are non-integral values which do not refer to individual texels. In addition to the (u, v) coordinates a sampling method must be specified. Sampling methods can be standard (like 'bicubic sampling') or customized, and their complexity can range from simple to very elaborate. The choice of the suitable sampling method depends on a number of aspects and almost always involves a trade-off, with the intended image quality and the capabilities of the hardware being the two most important aspects.

Textures provide an advantageous way of storing image information. However, unless otherwise noted, in the context of this invention the term 'texture' shall be used in a more general way for any structure that contains image information of a certain view.

The image information for the two different views that are available in this system is stored in two different textures. Each screen pixel is assigned to either of the two views which are displayed through two channels. In the first place, the assigned channel decides from which texture the data are to be sampled. However, when a pixel is located at a boundary between two channels (e.g. the pixel is assigned to the left channel, but its immediate neighbour is assigned already to the right channel), the system offers the possibility to determine the image content of the pixel by blending information from the two textures in a way so that this blend reflects the location of the boundary with maximum accuracy. In certain types of 2-view autostereoscopic displays these 'border' pixels are normally invisible to both eyes. They may however become visible at least temporarily when the user moves his head sideways or changes the viewing distance from the screen. In these cases, the feature of blending information improves the image quality and makes the system more robust.

SUMMARY OF THE INVENTION

It is an object of the invention to provide an autostereoscopic system according to the claims which offers more flexible viewing options.

In order to achieve this object, the method according to the invention is characterized by the following steps that precede step (a):

- selecting a view mode from a plurality of pre-defined view modes which comprise view modes with different numbers of views to be displayed; and
- creating a channel mask that defines a number N of channels per segment of the optical plate, wherein N is larger than or equal to the number of views in the selected view mode;
- providing a texture for each of the N channels; and
- correlating each screen pixel with at least one of the textures by reference to the channel mask (M).

This method has the advantage that the number of views to be displayed may be selected, e.g. by the user or by the system itself, and the allocation and sampling algorithms will be adapted accordingly, either manually or automatically.

Such a system enables the (to a large extent) free choice of a number of viewers, a number of views, a number of channels to display these views, and the free assignment of these three to each other, even while the system is running.

Furthermore a tracking system may or may not be employed at a given moment. Each of these settings shall be called a 'mode' and changing these setting, which is possible even during operation of the system, is a 'change of mode'.

The invention takes advantage of the fact that the concept of textures offers a high flexibility in organizing the image information for an arbitrary and variable number of views, and in making this information available for being displayed as required, even under dynamically changing conditions, including in particular the possibility to blend information from different textures. Naturally, the number of channel borders and, accordingly, the number of pixels that are located on a channel border increases with the number of views, and it becomes a regular and quite frequent event that such border pixels become visible, e.g. when the user moves from one view position to the other. Therefore, the feature of blending of information in order to smoothen the transitions from one view to another offers a particular advantage in a multi-view setting.

More specific optional features of the invention are indicated in the dependent claims.

A system according to the invention may be able to determine at any time the number and the position(s) of the users in front of the display. This can easily be achieved e.g. by using a tracking system. Depending on this information an algorithm can decide how many views should be rendered in this situation, how many channels be provided to deliver these views (the numbers of views and channels may or may not be equal). If only one user is present, then it may be sufficient to provide only the two 'native' views that a 3D content file typically contains. Also tracking will be employed to ensure that this user always sees a consistent stereo image.

In case a second user steps in front of the display the algorithm may decide to render a third view by interpolating the existing two ones and, by using the eye-tracker, employ a dynamic channel mask that is optimized for giving each of these two viewers a consistent stereo image at any time (although for certain position constellations this may not be possible).

In case more users step in, the system may 'decide' to create even more views by use of a known approach called '2-to-N conversion'. At a certain number of users it may 'decide' to switch off the tracking system which will turn the system from a dynamic into static mode. Alternatively the system may still measure the average position (the 'centre') of a group of users and fine-tune the system accordingly.

Even the lens array can be subject of such mode changes. So-called switchable lens arrays exist which consist of a stack of optical components where the refraction index of a certain layer can be changed, e.g. by applying a voltage. The optical stack will e.g. be transparent like a sheet of glass when no voltage is present, and functionally turn into a lens array when the voltage is switched on. Such a process may even allow to set the refraction index arbitrarily to any value between two given indexes $n_1$ and $n_m$ so that the magnification of the lens can be adjusted to anything from 1 (no magnification) to m (full magnification).

This feature may be used by the system to increase magnification when more users are present because this will allow to display more views in more channels (although at reduced resolution).

The special case of only one view ('2D mode') will cause the lens array to be turned off, in this way restoring full 'native' 2D resolution in the system for any number of users.

Mode changes can be used to enable 'look-around' effects in a dynamic way for a single user. For this the user's position is passed on to the software that generates the image on the screen so that the two views presented to the user are rendered to match the user's position in space.

In addition to selecting between different numbers of views, the option is given to switch between a static mode in which the view positions are fixed, and a dynamic mode in which the viewing position can be changed and the screen content is adjusted accordingly on the basis of position tracking.

The invention may also be used for implementing a super multi-view system, i.e. a system where the number of views is so large and the beams originating from neighbouring screen pixels are so narrow and dense that the widths of the beams at the view position is smaller than the width of the eye pupil, with the result that the viewer sees a superposition of two or more views at a time with one and the same eye. In addition to making the transitions between the views extremely smooth, such a system may be advantageous in order to mitigate or completely resolve the so-called accommodation-conversion conflict. As is well known in the art, the 3D impression perceived by a human depends not only on parallactic differences between the left and right eyes but also on the accommodation of the focal length of the eye lens to varying object distances. These two factors may sometimes conflict with one another, and a super multi-view system is expected to improve the quality of the 3D effect in such cases and to make viewing 3D images more agreeable.

In a static super multi-view system, the required number of views will have to be considerably high, e.g. in the order of N=50 or more. Consequently, in order to obtain a reasonable resolution of the 3D image (small size of the super pixels), the resolution of the screen grid must be extremely high. The invention permits to reduce the required number of views to a reasonable value, e.g. N=6 or N=8, by combining multi-view with eye tracking, so that the views just need to cover the width of the pupils of both eyes.

The sampling algorithms for determining the content of each pixel which is visible either with the left eye or the right eye of a user may also be configured individually for each user. For example, it is known that, when the human brain interprets a scenario that is seen with both eyes and with parallactic displacement between the two views, the information obtained from one eye will generally be dominant over the information obtained from the other eye, and the dominance is different for each individual. The invention offers the possibility to compensate this effect, for example by somewhat fading the image that is presented to the dominant eye.

BRIEF DESCRIPTION OF THE DRAWINGS

Preferred embodiments will now be described in conjunction with the drawings, wherein.

DETAILED DESCRIPTION

Figure 1:
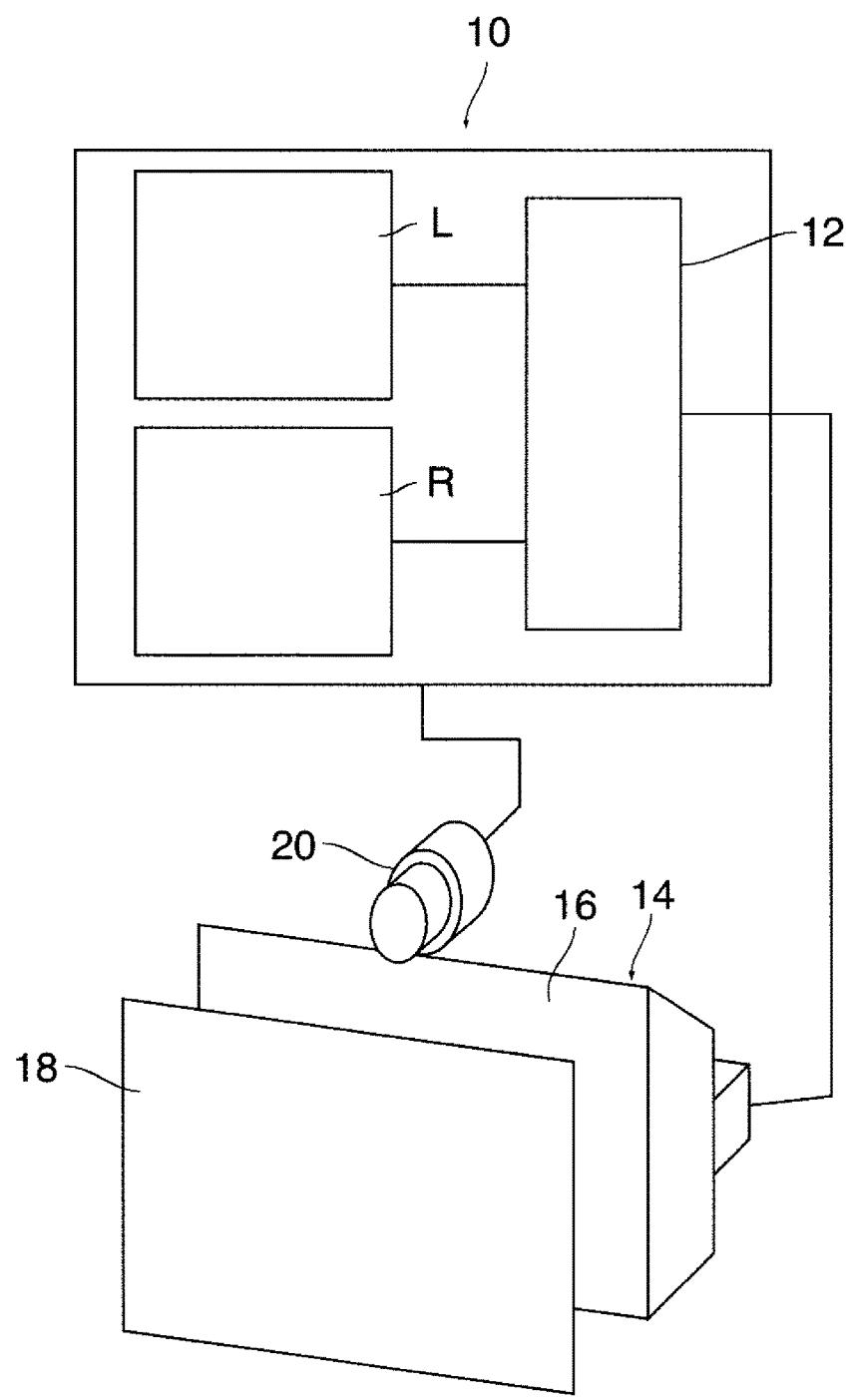
FIG. 1 is a block diagram of an autostereoscopic system according to the invention.

FIG. 1 shows an autostereoscopic system comprising a computer system 10, e.g. a personal computer, including a graphics card 12 which drives a monitor 14 so as to display images on a screen 16 of the monitor. A lens array 18 is disposed in front of the screen 16, and a video camera forming part of an eye tracking or head tracking system 20 is attached to the monitor 14 and communicates with the computer system 10.

The graphics card 12 has access to two textures L and R that are stored in a memory of the computer system 10. The texture L stores image information of a left view, i.e. image information that is to be displayed to the left eye of a user (not shown) who looks at the screen 16 through the lens array 18. Similarly, the texture R stores image information of the right view for the right eye of the user. The head tracking system 20 keeps track of any movements of the user's head and signals these movements to the computer system which will then adapt the information displayed on the screen 16 to match the changed position of the user.

Figure 2:
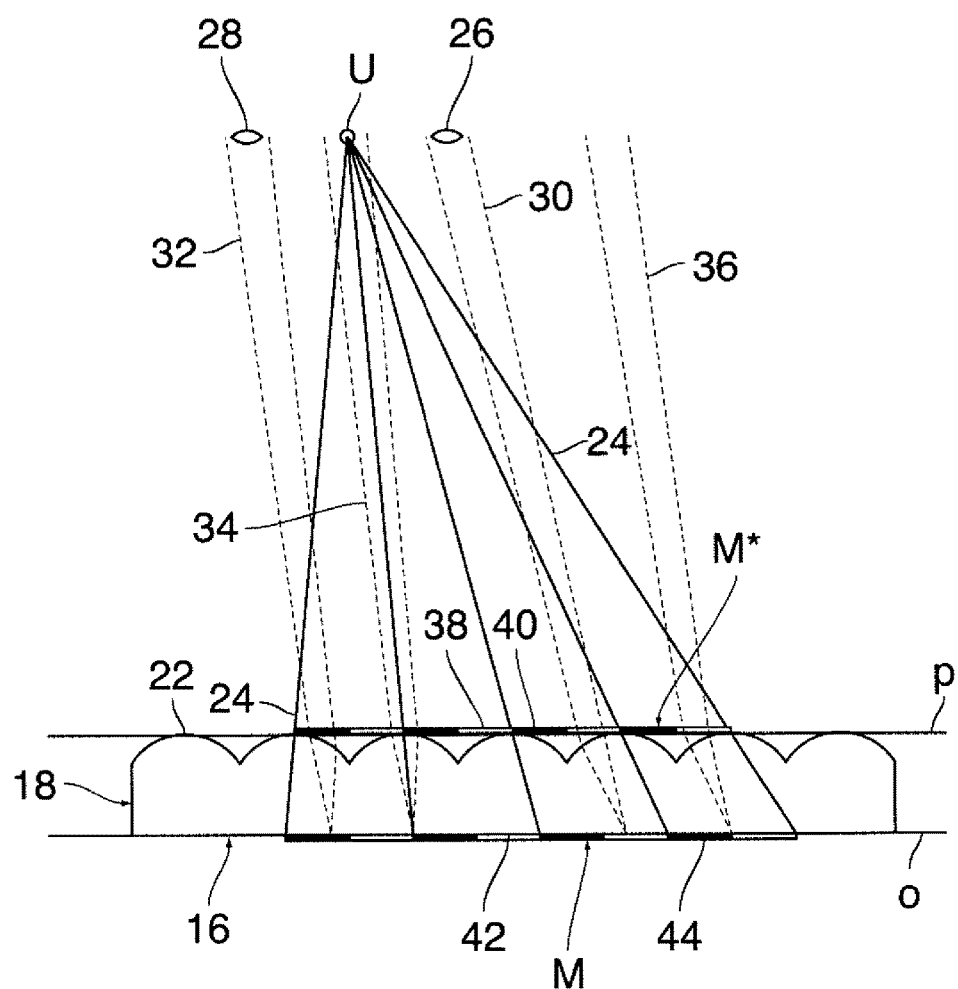
FIG. 2 is a cross-sectional view of a lens array and channel masks in a 2-view configuration.

FIG. 2 is a schematic cross-sectional view of the screen 16 and the lens array 18. The flat screen 16 may for example be a TFT screen comprising a TFT layer. The lens array 18 is formed by a transparent plate having a plane back surface and a corrugated front surface defining an array of parallel cylindrical lenses 22. For simplicity, the lens array 18 has been shown here as a solid block held in direct contact with the surface of the screen 16. In practice, the lens array may comprise different layers with different refraction indexes, possibly including a glue layer that bonds it to the surface of the screen. Conversely it may be separated from the screen by an air gap.

A set of rays 24 symbolises light rays that are emitted from various points in the TFT layer of the screen 16 and pass each through an apex of one of the lenses 22 before they finally meet in a point U which symbolises an idealised position of a user or viewer who looks at the screen. A plane p passing through the apex lines of each of the cylindrical lenses will be termed the principal plane of the lens array. A plane o is an equivalent of the object plane of the lens array but has been shifted from the true object plane in order simplify the illustration by eliminating the effect that the light passing through the layer or layers of the lens array would be refracted even when these layers were plane-parallel plates. Thus, the points from which the rays 24 originate in the plane o may be considered as the projections of the apex lines of the cylindrical lenses 22 when illuminated from a source located at the point U.

FIG. 2 also shows the left and right eyes 26, 28 of the user and that the point U indicating the idealised position of the user is defined as the point at the centre of the line connecting the eyes 26 and 28 (or more precisely, their pupils' apexes). Further, FIG. 2 shows several light beams 30, 32, 34, 36, which are emitted in the object plane o, are deflected by the lenses of the lens array 18 and then propagate towards the eyes 26, 28 of the user or past the same. While the rays 24 are not deflected by the lenses (at least in this simplified illustration), because they pass through the centres of the lenses, the rays in the beams 30-36 are deflected (and also collimated) at the curved surfaces of the cylindrical lenses. The rays of the beam 30 are so deflected, that they hit the left eye 26 of the user. Similarly, the rays of the beam 32 are so deflected that they hit the right eye 28 of the user. In contrast, the center ray of beam 34 passes through the centre of its associated lens and is therefore not deflected, and the beam itself is collimated and hits the point U right between the eyes of the user. Thus, this beam and the associated pixels on the screen are not visible for the user. Similarly, the beam 36 is deflected so that it passes by the left eye of the user, so that this beam and the associated pixels are not visible for the user, neither. It will thus be understood that for any given viewing position the image displayed in the plane o is subdivided into stripes or segments that are visible only for the left eye 26 of the user, alternating with segments that are visible only for the right eye 28 of the user, and that for magnifications larger than 2 these segments are separated by "invisible zones" that are not visible at all. In particular, the zone corresponding to the beam 34 separates a segment associated with the left eye 26, and hence the left channel of the image information, from a segment associated with the right eye 28 and the right channel.

This property of the lens array 18 is represented by a lens channel mask M* which divides the principal plane p into left channel zones 38 (shown in white in FIG. 2) and right channel zones 40 (shown in black). The apex lines of the cylindrical lenses form first-type transitions from a left channel zone 38 to a right channel zone 40.

Since the lens array is periodic, second-type transitions are formed halfway between the first-type transitions, coincident with the borders between adjacent cylindrical lenses of the lens array 18.

As is further shown in FIG. 2, the lens channel mask M* can be projected into the plane o, with the position U as the projection centre. This results in a screen channel mask M with projected left channel zones 42 and projected right channel zones 44. When a pixel in the plane o and hence in the surface of the screen 16 falls within a left channel zone 42, it is associated or correlated with the left channel, and when it falls within the right channel zone 44 it is associated or correlated with the right channel. Thus, it can be determined for each pixel that is entirely contained in one zone to which channel it belongs, i.e. by which eye it will be seen or would be seen if it could be seen at all.

The distance from the user to the screen is considered to be optimal when the invisibility zones at the first-type transitions and the invisibility zones at the second-type transitions have equal widths. When the user retreats further from the screen, the first-type invisibility zones will shrink and will eventually vanish, at the very moment when the divergent beam 34 hits both eyes 26, 28 of the user. Conversely, when the user approaches the screen, the second-type invisibility zones (as symbolised by the beam 36) will shrink and eventually vanish. When one type of invisibility zones vanishes, the left and right channels are no longer completely separated, i.e. some pixels or parts thereof are visible with both eyes.

When in FIG. 2 the user moves to the left or to the right, the screen channel mask M will shift in the opposite direction, but this can be compensated for by shifting the image displayed on the screen by the same amount. If no head or eye tracking system is present, the image will of course preferably be displayed in such a position that it can optimally be viewed by a user who is located symmetrically to the centre of screen, both vertically and horizontally.

As can further be seen in FIG. 2, the screen channel mask M is enlarged in comparison to the lens channel mask M*. This enlargement is due to the projection, i.e. the divergence of the rays 24, and not related to the enlarging properties of the individual cylindrical lenses.

Figure 3:
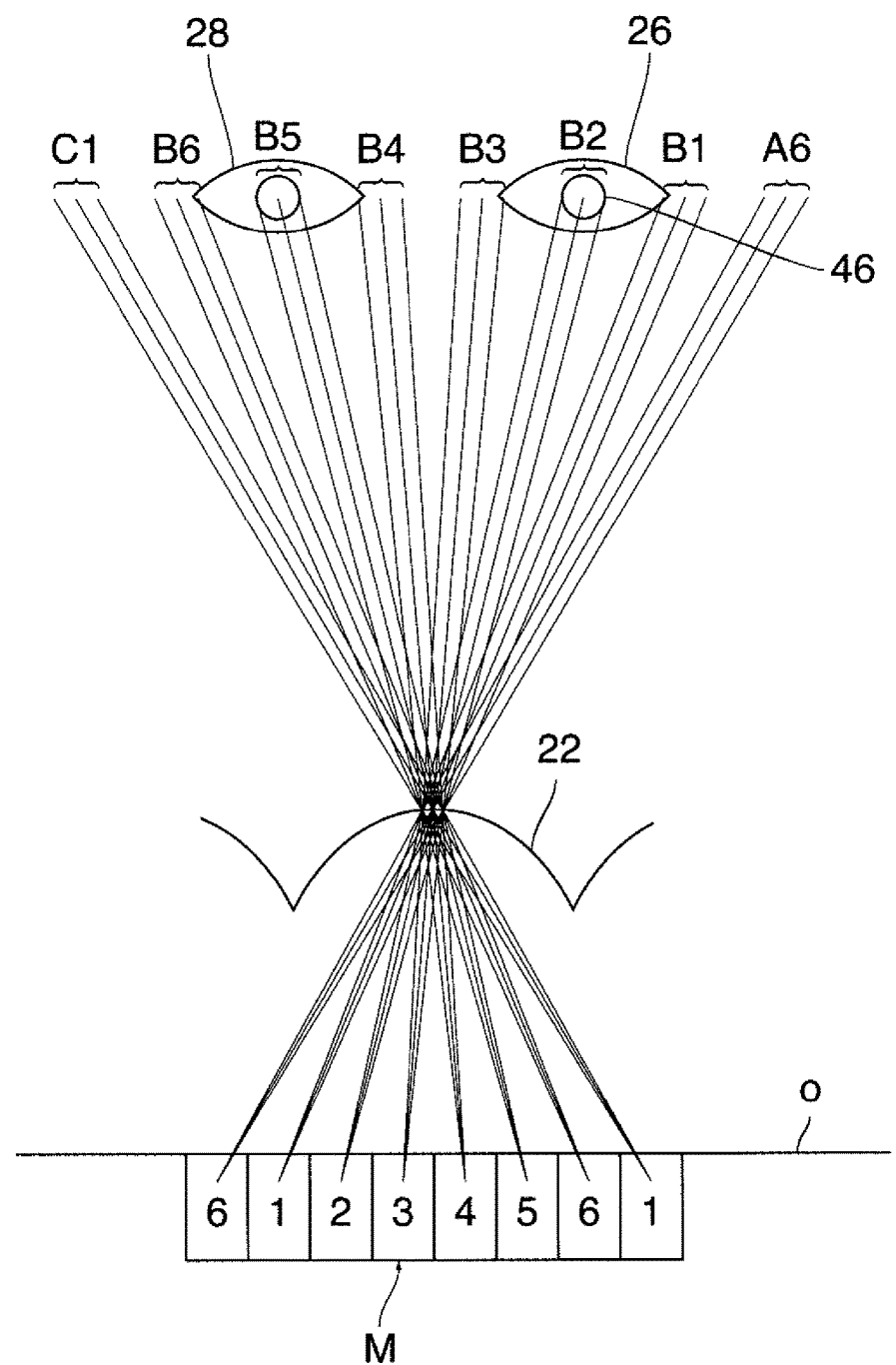
FIG. 3 is an enlarged cross-sectional view of the lens array and a channel mask in a 6-view configuration.

FIG. 3 shows, on an enlarged scale, a view similar to FIG. 2, but for a 6-view system. In this case, for each individual lens 22 of the lens array, the screen channel mask M is divided into six channels 1-6. In general, the number of channels per lens is at least as large as the desired number N of views. It is possible however that some channels contain redundant information and the number of channels per lens is larger than the number of views.

FIG. 3 shows the lens 22 that has the same lateral position as the viewing position and is therefore viewed head-on by the user. As a consequence, for this lens there is no offset between the screen channel mask M and the corresponding lens channel mask which are not shown in FIG. 3. Beams B1-B6 are shown for each of the channels 1-6 that are covered by the lens 22. The beam B2 hits the pupil 46 of the left eye 26 of the viewer, and beam B5 hits the pupil of the right eye 28. The other beams, B1, B3, B4 and B6 are not visible in this situation. Also invisible are a beam A6 that stems from a channel 6 of a neighbouring segment (corresponding to a neighbouring lens) of the channel mask M, and a beam C1 that stems from a channel 1 of a neighbouring segment on the other side.

The beams B1-B6 represent the six different views of the 6-view system. The beams B2 and B5 which are visible with the left and right eyes form a stereo-pair, so that a 3D image will be perceived when suitable image information is displayed on the screen in the corresponding channels 2 and 5.

When in FIG. 3 the user moves his head to the right he will see the beams B1 and B4 which form another stereo-pair. Conversely, when he moves to the other side, he will see the beams B3 and B6 forming yet another stereo-pair. Thus, even though the channel mask M is static in this example (does not move when the view position changes), the user is still capable of perceiving a 3D image as long as the lateral movement of his head is limited to a certain range. To that end, the channels 1 to 3 must include image information for the left eye 26, and the channels 4 to 6 must include image information for the right eye 28.

In a multi-view system according to FIG. 3 the user will see a stereo-pair only if the ordinal number of the channel for the right eye is greater than the ordinal number for the left eye. When the user moves far enough to the right in FIG. 3 so that he sees the beams A6 and B3, his left eye 26 will perceive image information from a channel 6, and his right eye 28 will perceive image information from a channel 3, so that the ordinal number (3) of the channel for the right eye would be smaller than the ordinal number (6) of the channel for the left eye. As a result the user will perceive an unrealistic inverted stereo image. The same applies when the user moves far enough to the left so that his right eye 28 is hit by the beam C1.

However, although not shown in FIG. 3, when the user moves further to the left, his right eye 28 will successively see beams C2, C3 corresponding to views for the left eye, and then a beam C4 corresponding again to a view for the right eye. At that moment, the left eye 26 will be hit by the beam C1 that is assigned to the left eye, and the user will again perceive a correct 3D image. It will therefore be understood that the system provides a plurality of suitable viewing positions from which a correct 3D image can be seen, separated by positions where an inverted image would be seen. The presence of more than one suitable viewing position permits the system to be used simultaneously by a plurality of viewers.

In order to generate a view that does not share image information with a neighbouring view, each of the six channels of the channel mask M must contain at least one pixel per line which is exclusive to this channel (i.e. no part of this pixel is covered by the neighbouring channel). It is possible, of course, that each channel includes two or more screen pixels which are assigned exclusively to this channel. For example, when each channel in FIG. 3 includes only one screen pixel, and the 6-view channel mask M is then replaced by a 3-view channel mask having only three channels underneath the lens 22, then two pixels will be available for each channel.

It will further be understood that each channel of the channel mask M is associated with a texture from which the image information for that channel is fetched. So in the example shown in FIG. 3 there will be six different textures. It is possible, however, to switch from the 6-view system shown in FIG. 3 to the 2-view system shown in FIGS. 1 and 2, for example, simply by regrouping the image information into only two textures (L and R) and by replacing the 6-view channel mask with a 2-view channel mask. In the same way, the number N of views may be changed arbitrarily as long as the requirement that there should be at least one pixel per channel and lens can be fulfilled in each pixel line.

Figure 4:
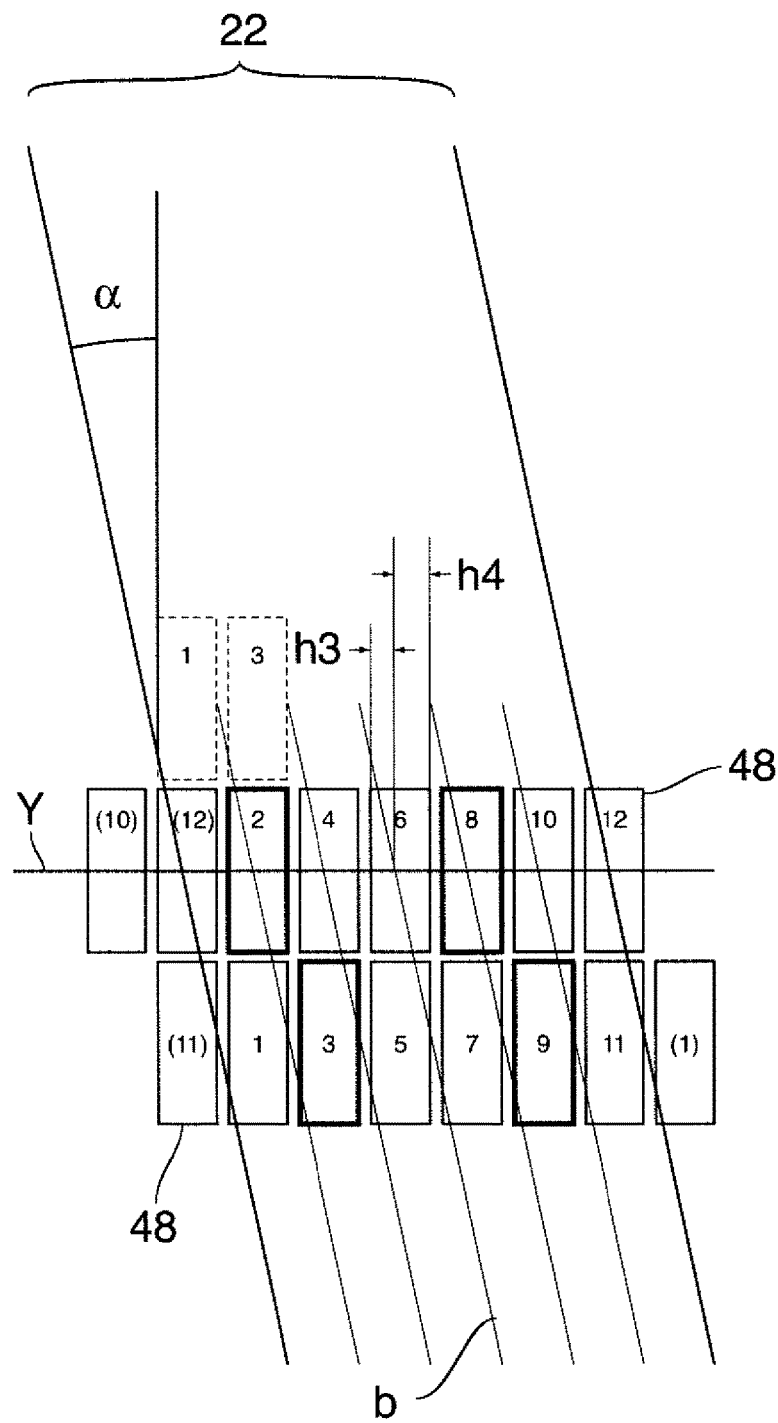
FIG. 4 is a schematic front view illustrating a spatial relationship between several pixels in two screen pixel lines and a cylindrical lens of the lens array.

FIG. 4 shows an enlarged front view of a portion of the screen 16, showing eight consecutive pixels 48 in each of two pixel lines as well as the boundaries of a single lens 22 of the lens array 18.

As is shown in FIG. 4, the cylindrical lenses 22 of the lens array 18 are not arranged vertically but form a certain angle $\alpha$ with the vertical pixel columns of the screen. Being able to choose this angle arbitrarily is advantageous for a number of reasons, including the minimization of different types of moiré and crosstalk. The method according to the invention can deal with any desired angle $\alpha$ as long as the lens arrangement provides a sufficient amount of parallax disparity, which is not the case at the latest when the lens inclination has reached 90°.

For simplicity, it shall be assumed here that the screen is a monochrome screen. The extension to a colour screen, e.g. an RGB screen in which each pixel is composed of a colour triplet of sub-pixels has been described in EP 2 044 480 B1 for a 2-view system. The principles disclosed there can be applied equivalently for systems and system configurations with more than two views.

In this example twelve pixels constituted by sets of six pixels each in two consecutive lines and located within the area of a single lens 22 have been designated by numbers from 1 to 12, with odd numbers being used for the pixels in the lower line and even numbers for the pixels in the upper line.

The channel boundaries are designated by lines b in FIG. 4. It can be seen that the relation between pixels and channels is not unique. For example, in the lower pixel line in FIG. 4, the pixels do not fit completely into the corresponding channel stripes, but the bottom left and top right corners are cut off and extend into the neighbouring channel. In the upper pixel line, this effect is even more pronounced, and the pixels are almost bisected by the channel boundaries. When it has to be decided which content should be displayed in these pixels, the uncertainty in the channel assignment should be taken into account. In the given example, the angle $\alpha$ has been selected so that the channel boundaries cut through the pixels in the same position for every second pixel line (e.g. pixel 1 in the bottom line is divided by the channel boundaries in the same way as pixel 1 in the topmost pixel line where the pixels 1 and 3 have been indicated in dashed lines).

There are several algorithms for assigning the pertinent channel or channels to each pixel. One possibility is to map the pixels onto the channel mask M and to calculate the size of the part of the surface area of the pixel that overlaps with each channel. If the pixel is completely contained in one channel, it will be uniquely assigned to that channel (with a correlation factor 1). If it overlaps with two or more channels it is correlated with each of these channels by a correlation factor that is proportional to the surface area with which the pixel and the respective channel overlap.

In an alternative approach, which is preferred here, a horizontal line Y is drawn through the centre of each pixel, so that the line segment of the line Y from the left boundary to the right boundary of the pixel is divided by the channel boundary b (e.g. between channels 3 and 4 in FIG. 4) is divided into sub-segments h3 and h4. Then the correlation of the pixel with each of the channels is proportional to the length of the sub-segment h3 and h4, respectively.

The pattern shown in FIG. 4 may be used for example for implementing a two-view system (N=2) with head tracking. Then, for example, only two of the six pixels in the same line and behind the same cylinder lens 22 would be visible, one pixel for each view. The remaining four pixels would contain copies of the two visible pixels for redundancy.

Another possible mode of operation would be a 12-view mode, wherein each of the twelve pixels 1-12 in FIG. 4 would be visible and allocated to a different view. In a six-view mode, every second pixel would be visible. The system could be static, i.e. without eye tracking.

In yet another mode, the lens array may be removed or switched into a non-refracting state, and the system may be operated in a 2D mode providing a maximum resolution.

In the 3D modes, when then lens array is active, each cylinder lens 22 will magnify the pixels in the direction normal to the lens direction. In a 6-view system, for example, the magnification ratio must be 6:1 at least, because only every sixth pixel must actually be visible to each eye (in this example the pixels of channel 2 with the left eye and the pixels of channel 5 with the right eye). To keep the visible parts of the channels as distant as possible from each other, in practice magnification factors of m=∞ are actually common with such a "narrow-spaced" system, so that for each eye the visible parts underneath each lens shrink to a line.

Figure 5:
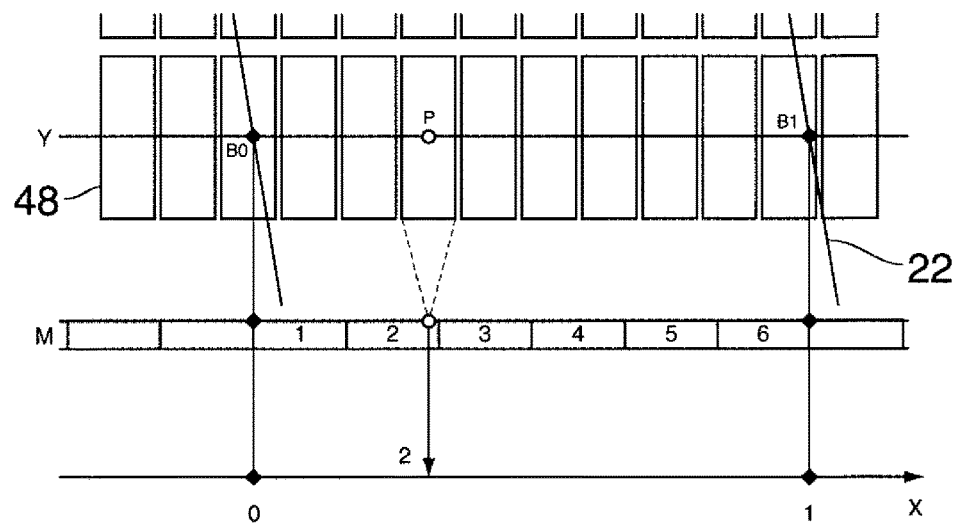
FIGS. 5 to 9 are diagrams illustrating different configurations in an embodiment of the invention.

FIG. 5 is a diagrammatic illustration of a part of a pixel line Y with pixels 48 covered by a single lens 22. The centre point of a pixel for which the image content is to be determined is designated as P. On the pixel line Y the interval of the channel mask defined by the lens 22 is bounded by the points B0 and B1. The corresponding channel mask M is shown below the pixel line. In this example, the interval between B0 and B1 contains nine pixels, and as the number of channels has been selected as N=6 the corresponding interval of the channel mask M is divided into six channels 1-6.

Shown below the channel mask M is a coordinate axis X that extends in the direction of the pixel lines and is normalized to the width of the interval from B0 to B1, so that B0 has the coordinate X=0 and B1 has the coordinate X=1.

The centre point P of the pixel in consideration happens to fall within the channel 2, and the width of the pixel covers parts of the channels 2 and 3.

In this example, the pixel in consideration is uniquely assigned to the channel (channel 2) that contains the centre point P of the pixel. Consequently, there would be no blend of images from different textures, and the transitions from one view to another would be abrupt. The correlation of a pixel with its channels is controlled by a parameter which is called the "sampling width" e. In FIG. 5 the sampling width is 0 which means that only the position of P is used to determine the channel associated to this pixel.

Figure 6:
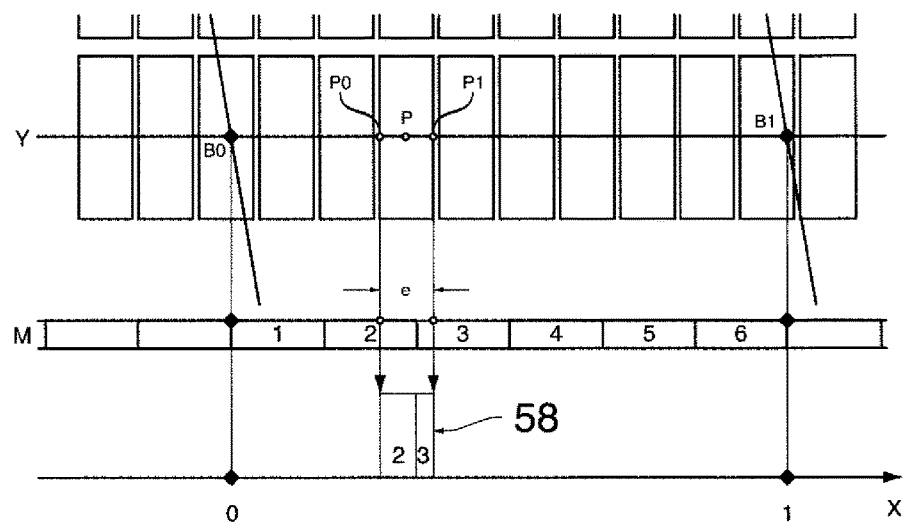

In FIG. 6 the sampling width has been set to e=1, in units of the width of a single pixel 48. The sampling width e defines a sampling interval that is bounded by points P0 and P1 and has the point P as its centre. On the channel mask M the sampling interval [P0, P1] covers parts of the channels 2 and 3. These channels divide the sampling interval into two sections of different size, as has been symbolized by a correlation rectangle 58. The correlation factor of the pixel with each channel is defined as the ratio between the width of the corresponding segment and the entire sampling width e. Thus, in this example, the ultimate image content of the pixel at P will be a weighted average (weighted with the correlation factors) of sampling results from the textures associated with the channels 2 and 3.

Figure 7:
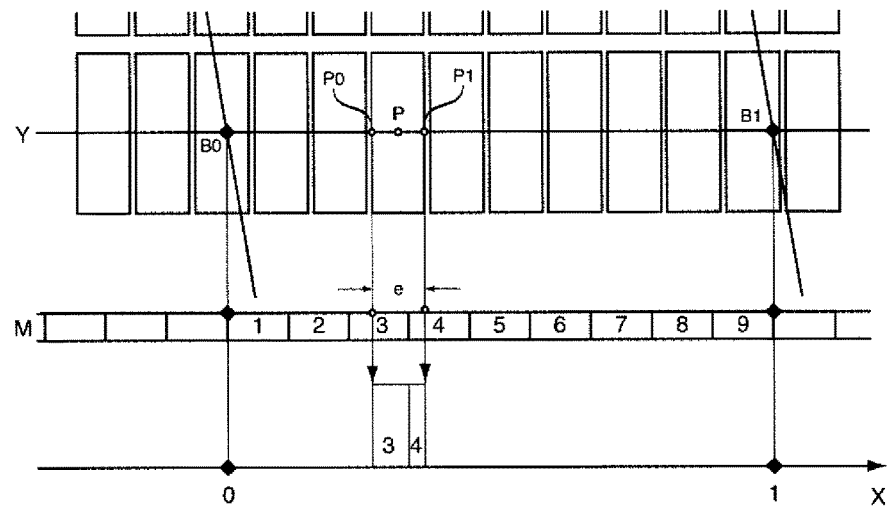

FIG. 7 illustrates an example with e=1 and N=9, so that the pixel in consideration is now correlated with the channels 3 and 4 rather than the channels 2 and 3 as in FIG. 6.

Figure 8:
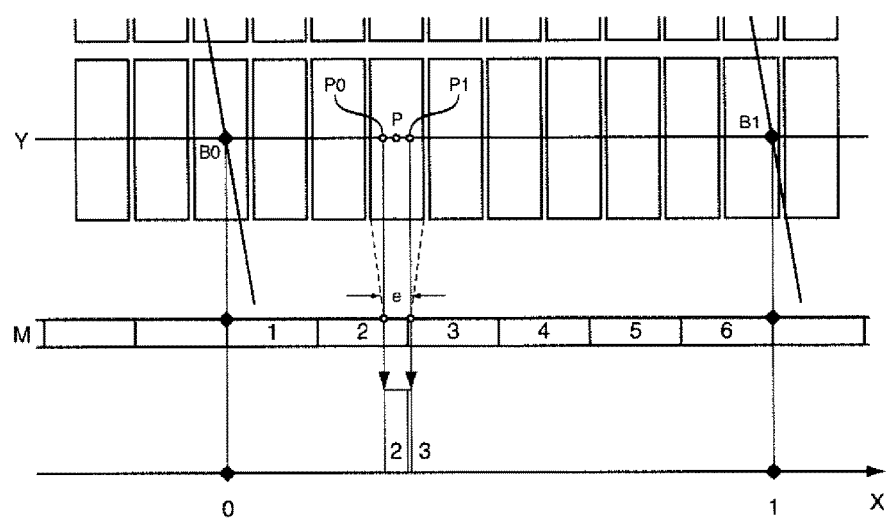

FIG. 8 illustrates a configuration which differs from FIG. 6 in that the sampling width has been selected to be smaller than 1: e=0.5, with the result that more pixels will be uniquely assigned to only one channel. With the number of channels being constant (in this case N=6), a greater sampling width will result in smoother transitions so that in FIG. 8 the transitions from one to another will be smoother than in FIG. 5 but not as smooth as in FIG. 6.

Figure 9:
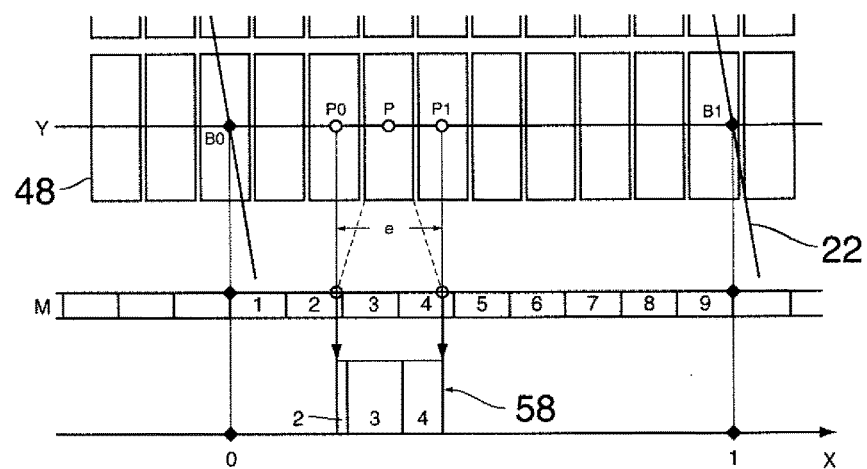

FIG. 9 shows an example with e=2.1 and N=9. Now the sampling interval [P0, P1] covers not only the channels 3 and 4 but also a small part of channel 2. Thus, in this example, the ultimate image content of the pixel at P will be a weighted average (weighted with the correlation factors) of sampling results from the textures associated with the channels 2 to 4.

Figure 10:
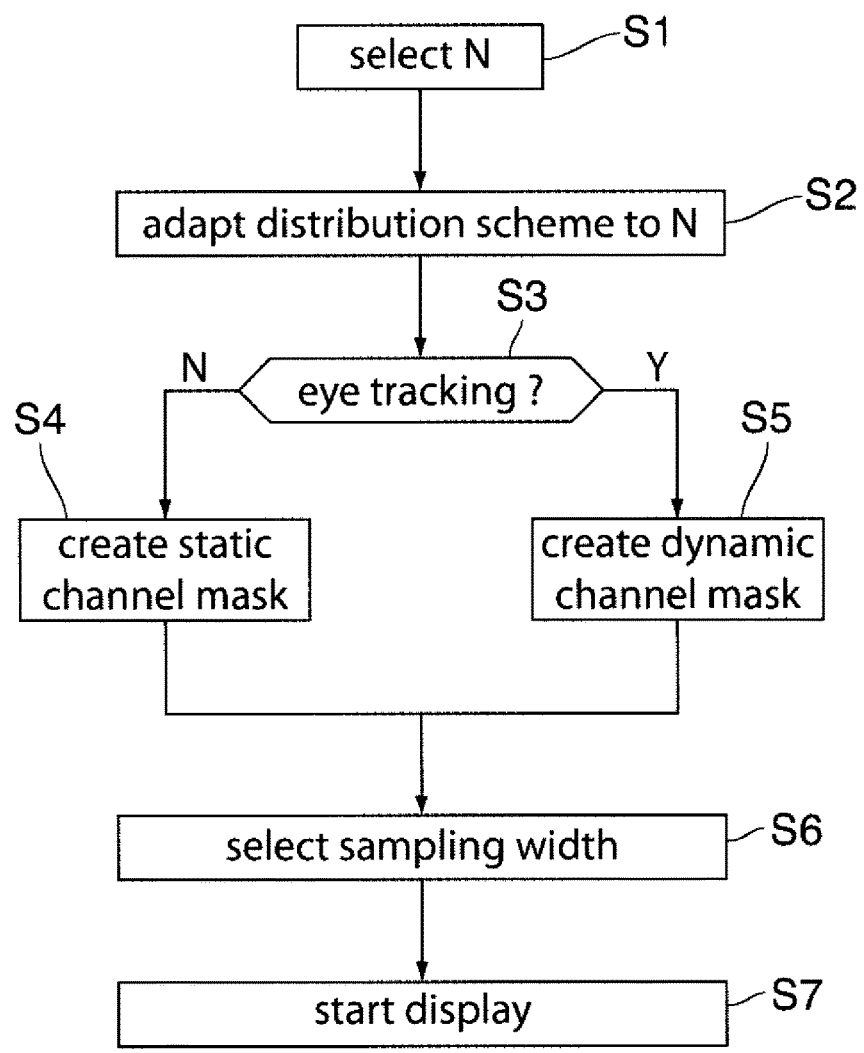
FIG. 10 is a flow diagram illustrating the method according to the invention

A general flow diagram illustrating the method according to the invention has been shown in FIG. 10.

In step S1, a selection is made for the number N of views to be displayed which determines also the number of textures to be generated. Note that N is not directly linked to the physical properties of the screen 16 and may be selected freely between 1 and a certain upper limit that is determined by the number of screen pixels in the interval from B0 to B1. For example, when a head tracking camera is available, this camera may be used to detect and count the number of viewers, and N will then be adapted automatically, either in direct or indirect proportion, to the number of viewers.

In step S2, a distribution scheme is set up that assures that the available image information will be distributed onto N textures. In the simplest case the image information is provided in a format that comprises N different views and this number N has been selected in step S1. Then the image information for each view is loaded into a different one of the textures in step S2.

It is possible however to select an N that is smaller than the available number of views. Then some of the available views may be discarded. If for example the available image information is in a 8-view format, and the user or the system selects N=4, he or the system may decide to discard the four outer views. In this case the transitions from view to view will be as smooth as in the 8-view configuration, but the range in which the user may move his head will be narrowed. As an alternative, the user may choose to discard every second view, with the result that the movement range will be as broad as before but the transitions from view to view will be more pronounced, which effect can be mitigated however by selecting a large sampling width e so as to enhance the channel blending, but only at the cost of increased 'blur' between neighbouring views.

Conversely, it is also possible to select N to be larger than the available number of views. In that case, copies of the available views may be loaded into the free channels. Optionally additional views may be calculated by means of interpolation or extrapolation techniques.

In case a 3D model of the scene is to be displayed then any number of views can be calculated directly from this model by positioning a respective number of virtual cameras in the 3D model The set-up of the distribution scheme in step S2 may be performed either manually by the user or automatically by the software. In the latter case, the user may be offered the choice between different options.

In step S3, the user or the system is prompted to decide whether he or it wants to use eye tracking or not. It should be noted however, that this decision is independent upon whether N=2 or N>2 has been selected.

When the user or the system decides that eye tracking shall not be used (N), a static channel mask is created in step S4, e.g. based on the assumption that the viewer is located in the optimal viewing distance and in front of the centre of the screen. However, other options for selecting a view position are possible.

When eye tracking has been selected in step S3 (Y), a dynamic channel mask will be created in step S5, based on the detected view position of the user. In a multi-user scenario with more than one user in front of the display, the eye tracking or head tracking system may be configured to follow a particular one of these users.

Subsequently to step S4 or S5, the sampling width e will be selected either automatically (by the system) or manually by the user in step S6.

Finally, the display algorithm is started in step S7, whereupon the set number N of views will be rendered by correlating each pixel with one or more of the N channels, sampling image data from the N textures and blending them on the basis of the selected sampling width e, as the case may be. In case of a 3D movie, the contents of the textures will of course be updated in every time slot.

In the autostereoscopic system shown in FIG. 1 it may also be possible to replace the lens array 18 by a different one, so as to optimize the performance (especially resolution) with respect of the selected number N of views. The replacement of the lens array 18 may give rise to certain mechanical adjustment errors. However, the channel masking and sampling procedures may easily be adapted to compensate for such errors, as has been described for example in EP 2 615 838 A1.

What is claimed is:

1. A method for the autostereoscopic representation of images on a display screen having a pixel grid, wherein a parallax separating optical plate comprised of a plurality of segments is disposed in front of the screen, and image information for left and right eyes of at least one user is displayed in interleaved pixel patterns on the screen, the method comprising the steps of:
    a) selecting a view mode from a plurality of pre-defined view modes which comprise view modes with different numbers of views to be displayed;
    b) creating a channel mask that defines a number N of channels per segment of the optical plate, wherein N is larger than or equal to the number of views in the selected view mode;
    c) providing a texture for each of the N channels;
    d) correlating each screen pixel with at least one of the textures by reference to the channel mask;
    e) then applying an allocation algorithm for allocating a total of the image information to be displayed at a time to at least two textures such that each texture includes the image information for one view; and
    f) for each pixel, applying a sampling algorithm for sampling image information from selected areas of the textures for determining an image content of the pixel,
    g) when one said pixel is correlated with more than one texture, providing the sampling algorithm with the steps of:
        1) determining a correlation factor of the pixel with each of said textures and
        2) blending sampling results from each of said textures in accordance with corresponding correlation factors.

2. The method according to claim 1, further including the step of changing the channel mask dynamically in accordance with changing view positions of at least one viewer.

3. The method according to claim 1, for each pixel, further including the step of providing the sampling algorithm with a step of calculating a sampling area and sampling image information from the sampling area in each texture with which the pixel is correlated.

4. The method according to claim 1,
further comprising a step of determining a sampling width, and
wherein the step of correlating each pixel with a number of textures comprises the sub-steps of:
placing a sampling interval in the channel mask, the sampling interval being centered on a center point of the pixel, and
determining the correlation factor of the pixel with each texture on the basis of the overlap of the sampling interval with the channels in the channel mask that are associated with the respective textures.

5. The method according to claim 1, further comprising a step of detecting the number of viewers with a camera and setting N to a value that depends upon the detected number of viewers.

6. A software product containing program code that is stored on a non-transitory computer-readable medium and, when run on a computer that is connected to a display with a parallax filter device, causes the computer to perform the method according to claim 1.

\* \* \* \* \*